Nov. 17, 1925.
F. PEUKER
WEIGHING SCALE
Filed July 22, 1924
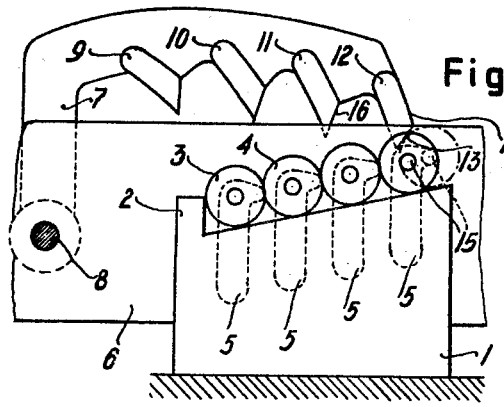
Fig. 1
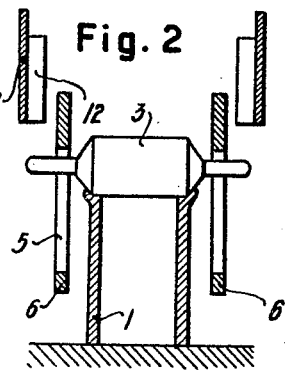
Fig. 2
Fig. 3
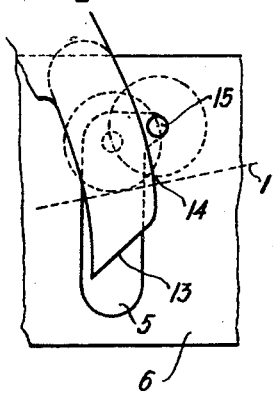
Fig. 4
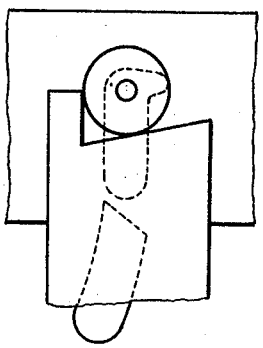
Fig. 5
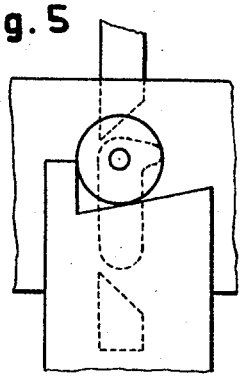
Fig. 6
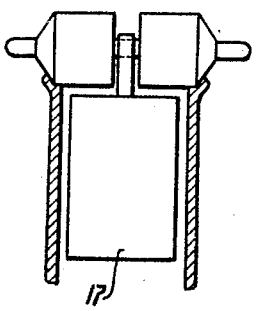
Fig. 8
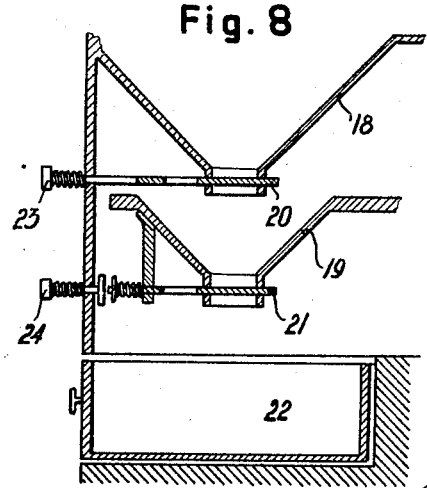
Fig. 7
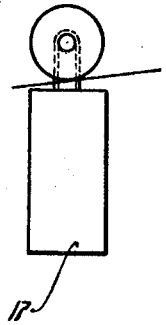
Inventor
Franz Peuker Patented Nov. 17, 1925.

1,561,997

UNITED STATES PATENT OFFICE.

FRANZ PEUKER, OF VIENNA, AUSTRIA, ASSIGNOR OF ONE-HALF TO THE FIRM: C. SCHEMBER & SÖHNE BRÜCKENWAAGEN-U, MASCHINENFABRIKEN A. G., OF ATZGERSDORF, NEAR VIENNA, AUSTRIA, A CORPORATION OF AUSTRIA.

WEIGHING SCALE.

Application filed July 22, 1924. Serial No. 727,565.

*To all whom it may concern:*

Be it known that I, FRANZ PEUKER, engineer, a citizen of the Republic of Austria, residing at Vienna, in the Republic of Austria, have invented certain new and useful Improvements in Weighing Scales, of which the following is a specification.

The present invention relates to weighing scales in which the scale pan for the poises is located within a closed casing and the poises are transferred to the scale pan from a frame located in the casing or reversely from the scale pan to the frame by means operated from outside of said casing. The invention mainly comprises a member common to a set of weights by which the weights are transferred one by one. Moreover the device comprises a taring arrangement which allows a very simple and speedy taring operation.

Figures 1 to 8 of the accompanying drawings show by way of example several embodiments of the invention.

Figure 1 is a side view of a weighing mechanism embodying my invention;

Fig. 2 is a transverse vertical section of Fig. 1;

Fig. 3 is an enlarged detail view illustrating the operation of the mechanism;

Figs. 4 and 5 are detail views of modified forms of the arresting device;

Figs. 6 and 7 are end and side views respectively of a modified form of the weights shown in Figs. 1 and 2, and Fig. 8 is a diagrammatic sectional view of portion of a taring device.

In Figs. 1 and 2 scale pan 1 for the poises of a weighing apparatus of any desired type is shown in its highest position. The surface of the pan is inclined, a projecting stop 2 being provided at one side of the pan against which the first poise 3 abuts. The second poise 4 abuts against the first weight, the third poise against the second and so on. The poises carry pins 15 on both sides engaging slots 5 in the supporting frame 6. The slots are formed in such a manner that they will allow a free oscillation of the scale pan when the weighing apparatus is operated. At the upper ends the slots are provided with lateral recesses, capable of engaging with the pins 15 of the poises. Several sets of poises may be arranged on a scale pan each set corresponding to a unit of the decimal or any other system.

The frame 6 carries a comb- or saw-like shifting and arresting device 7 which is pivotally mounted at 8. According to the number of poises teeth 9, 10, 11 and 12 or more are so arranged on said device that they will upon movement of the member 7 in the direction of the arrow successively meet the pins 15 of the poises. Each tooth is provided with a face 13 for shifting and a face 14 for arresting the poise. If the member 7 is moved as shown by the arrow the face 13 of tooth 12 meets pin 15 of the corresponding poise which in its turn is brought into the position shown in dotted lines, the pin 15 being at the same time shifted into the recess of the corresponding slot 5 and thereby is brought to rest on the frame 6. The poise is in this position slightly lifted from the scale pan 1 and does no longer rest on the same. Upon further movement of the member 7 the arresting face 14 of the tooth 12 glides along the pin 15 (Fig. 3) thus fixing the poise in its position. As the movement continues the face 16 of the second tooth 11 meets the next poise and the above described operation is repeated. Each tooth must be of appropriate length so as to hold the pinion of one poise till the next pin is engaged. The remainder of the poises will then be automatically arrested. When the arresting device 7 is moved in the opposite direction the poise 3 will be first released and returns to its initial position owing to its own weight.

Fig. 4 shows a modification according to which the member 7 performs a rocking movement in the upward direction. Fig. 5 shows a portion of a tooth of another modification of the invention in which the movement of the member 7 is a rectilinear one. Also in this modification the teeth may be moved either in the upward or in the downward direction.

Figs. 6 and 7 show a rolling poise which carries an auxiliary poise 17 for increasing its own weight.

Fig. 8 shows a taring device. 18 and 19 are funnel shaped vessels each closed by slide 20 and 21 respectively. 22 designates a drawer. The funnel 18 is rigidly fixed on the frame, whereas the funnel 19 is rigidly connected with the scale pan. The funnel 18 is filled with taring material. If the weight of the scale pan is to be increased the slide 20 is held open by pressing the button 23 until the quantity of taring material required has collected within the funnel 19. If too much taring material has fallen down into the funnel the button 24 is pressed and the slide 21 opened thereby till the excess of taring material has been removed into the drawer 22 which also serves for storing the poises when the weighing scale is out of use. The taring material that has collected in the drawer may be again filled into the funnel by hand.

What I claim is:

1. A weighing scale comprising a weight supporting frame, a scale pan adapted to receive the weights, and a shifting device operatively connected with the frame adapted to successively transfer the weights from the frame to the scale pan and from the latter to the frame.

2. A weighing scale comprising a weight supporting frame, a scale pan movable in the latter adapted to receive the weights, and a weight shifting device pivoted in the frame adapted to successively transfer the weights from the frame to the scale pan and from the latter to the frame.

3. A weighing scale comprising a weight supporting frame having a series of slots formed therein, a plurality of weights mounted in the frame, means to successively shift the weights in the slots, and a scale pan adapted to receive the weights.

4. A weighing scale comprising a weight supporting frame having a series of slots formed with transverse recesses, a plurality of weights having lateral extensions adapted to engage said recesses whereby the weights are supported in the frame, a scale pan adapted to support the weights, and a pivoted member adapted to successively shift the weights from the frame to the pan, and vice versa.

5. A weighing scale comprising a weight supporting frame having a series of slots formed with transverse recesses, a plurality of weights having lateral bearing pins projecting into the slots and adapted to engage said recesses whereby the weights are supported in the frame, a scale pan having inclined surfaces adapted to support the pins, and a pivoted member having a series of graduated teeth adapted to successively engage the pins and shift the latter from the recesses onto the inclined surfaces of the scale pan.

6. A weighing scale comprising a weight supporting frame having a series of vertical slots formed with transverse recesses, a plurality of weights having lateral bearings projecting into the slots and adapted to engage said recesses to support the weights, a scale pan having inclined bearing faces to receive said pins, a shifting device pivoted in the frame, a series of graduated teeth on the shifting device having inclined faces adapted to move the pins in the slots and recesses, whereby the weights are successively shifted from the frame to the scale pan and from the latter to the frame.

In testimony whereof I have hereunto set my hand.

FRANZ PEUKER.